US012598423B2

(12) United States Patent
Liang et al.

(10) Patent No.: US 12,598,423 B2
(45) Date of Patent: Apr. 7, 2026

(54) SMART VOLUME CONTROLLER AND METHOD THEREOF

(71) Applicant: xMEMS Labs, Inc., Santa Clara, CA (US)

(72) Inventors: Jemm Yue Liang, Sunnyvale, CA (US); Yanchen Lu, Campbell, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 19/287,761

(22) Filed: Jul. 31, 2025

(65) Prior Publication Data

US 2026/0046561 A1 Feb. 12, 2026

Related U.S. Application Data

(60) Provisional application No. 63/681,167, filed on Aug. 9, 2024, provisional application No. 63/681,157, filed on Aug. 9, 2024.

(51) Int. Cl.
| | |
|---|---|
| *H04R 3/04* | (2006.01) |
| *H04R 3/00* | (2006.01) |
| *G06F 3/16* | (2006.01) |
| *H04R 1/24* | (2006.01) |
| *H04R 1/28* | (2006.01) |

(52) U.S. Cl.
CPC ................ *H04R 3/04* (2013.01); *H04R 3/00* (2013.01); *G06F 3/165* (2013.01); *H04R 1/24* (2013.01); *H04R 1/28* (2013.01)

(58) Field of Classification Search
CPC ............. H04M 1/725; H04M 1/72577; H04M 1/72442; H04R 1/24; H04R 1/28; H04R 3/00; H04R 3/04; H04W 4/00; H04W 4/02; H04W 4/04; H04B 1/02
See application file for complete search history.

(56) References Cited

U.S. PATENT DOCUMENTS

| | | | | |
|---|---|---|---|---|
| 11,943,585 B2 | 3/2024 | Liang | | |
| 12,107,546 B1 | 10/2024 | Liang | | |
| 12,261,567 B2 | 3/2025 | Liang | | |
| 2008/0205195 A1* | 8/2008 | Van Der Merwe | .... | G10K 15/02 |
| | | | | 367/137 |
| 2017/0019525 A1* | 1/2017 | Hannon | .................. | G01S 1/752 |
| 2019/0238974 A1* | 8/2019 | Hong | ........................ | H04R 3/04 |
| 2023/0054865 A1* | 2/2023 | Zhang | .................... | G06F 3/165 |

* cited by examiner

*Primary Examiner* — Van T Trieu
(74) *Attorney, Agent, or Firm* — Winston Hsu

(57) ABSTRACT

A controller configured to control a sound producing module includes a volume controlling unit configured to determine a demodulation amplitude and a modulation amplitude corresponding to a target volume. The sound producing module comprises a driving circuit and an air-pulse generating device. The driving circuit generates a demodulation driving signal according to the demodulation amplitude and generates a modulation driving signal according to the modulation amplitude, so as to drive the air-pulse generating device. The air-pulse generating device produces sound via generating a plurality of air pulses at an ultrasonic pulse rate.

22 Claims, 7 Drawing Sheets

SMART VOLUME CONTROLLER AND METHOD THEREOF

CROSS REFERENCE TO RELATED APPLICATIONS

This application claims the benefit of U.S. Provisional Application No. 63/681,167, filed on Aug. 9, 2024. Further, this application claims the benefit of U.S. Provisional Application No. 63/681,157, filed on Aug. 9, 2024. The contents of these applications are incorporated herein by reference.

BACKGROUND OF THE INVENTION

1. Field of the Invention

The present application relates to a smart volume controller and controlling method thereof, and more particularly, to a smart volume controller and method thereof achieving superior audio fidelity or power efficiency.

2. Description of the Prior Art

Conventional audio system volume control mechanisms frequently compromise sound quality and operational efficiency. A primary challenge lies with digital volume reduction, a widely adopted technique that inherently degrades the Signal-to-Quantization Noise Ratio (SQNR). This occurs through the truncation of least significant bits (LSBs), resulting in a reduced effective bit depth and an amplified noise floor relative to the attenuated signal. Consequently, achieving comfortable listening levels often comes at the cost of diminished audio fidelity, as essential audio detail is masked by quantization noise.

Furthermore, traditional transducers suffer from a fundamental lack of direct sensitivity control. This deficiency mandates that volume adjustments be managed by altering the driving electrical signal from the Digital-to-Analog Converter (DAC), leading to increased power consumption for louder volumes. This forces a critical trade-off between power efficiency and audio quality: either the DAC operates at maximum resolution for fidelity, consuming more power, or resolution is sacrificed for power savings, introducing higher noise. Alternative post-DAC methods, such as voltage dividers or acoustic cavity designs, similarly fall short, often introducing noise, linearity issues, or mechanical complexity, without offering the high-resolution control required for modern high-fidelity systems. These persistent limitations highlight the critical need for solutions that can overcome SQNR degradation and optimize power usage without compromise.

SUMMARY OF THE INVENTION

It is therefore a primary objective of the present application to provide a smart volume controller and method thereof achieving superior audio fidelity or power efficiency, to improve over disadvantages of the prior art.

An embodiment of the present application provides a controller configured to control a sound producing module. The controller comprises a volume controlling unit configured to determine a demodulation amplitude and a modulation amplitude corresponding to a target volume. The sound producing module comprises a driving circuit and an air-pulse generating device. The driving circuit generates a demodulation driving signal according to the demodulation amplitude and generates a modulation driving signal according to the modulation amplitude, so as to drive the air-pulse generating device. The air-pulse generating device produces sound via generating a plurality of air pulses at an ultrasonic pulse rate.

An embodiment of the present application provides a controller configured to control a sound producing module. The controller comprises a volume controlling unit. The sound producing module comprises an air-pulse generating device. The air-pulse generating device produces sound via generating a plurality of air pulses at an ultrasonic pulse rate. The volume controlling unit adjusts a parameter such that an operating frequency of the air-pulse generating device is adjusted. A volume of the sound produced by the air-pulse generating device is adjusted via adjusting the operating frequency.

An embodiment of the present application provides a volume determining method, applied in a volume controlling unit within a controller for controlling a sound producing module. The volume determining method comprises determining a demodulation amplitude and a modulation amplitude corresponding to a target volume. The sound producing module comprises a driving circuit and an air-pulse generating device. The driving circuit generates a demodulation driving signal according to the demodulation amplitude and generates a modulation driving signal according to the modulation amplitude, so as to drive the air-pulse generating device. The air-pulse generating device produces sound via generating a plurality of air pulses at an ultrasonic pulse rate.

An embodiment of the present application provides a volume adjusting method configured to adjust a volume of a sound producing module. The volume adjusting method comprises adjusting an operating frequency of an air-pulse generating device corresponding to an ultrasonic pulse rate. The sound producing module comprises the air-pulse generating device. The air-pulse generating device produces sound via generating a plurality of air pulses at the ultrasonic pulse rate.

These and other objectives of the present invention will no doubt become obvious to those of ordinary skill in the art after reading the following detailed description of the preferred embodiment that is illustrated in the various figures and drawings.

DETAILED DESCRIPTION

Content of U.S. Pat. Nos. 11,943,585, 12,261,567 and 12,107,546 is incorporated herein by reference.

By exploiting features of air-pulse generating (APG) device and its companion driving circuit, it is possible to integrate sensitivity adjustment into volume control of sound producing system to achieve superior audio fidelity.

Figure 1:
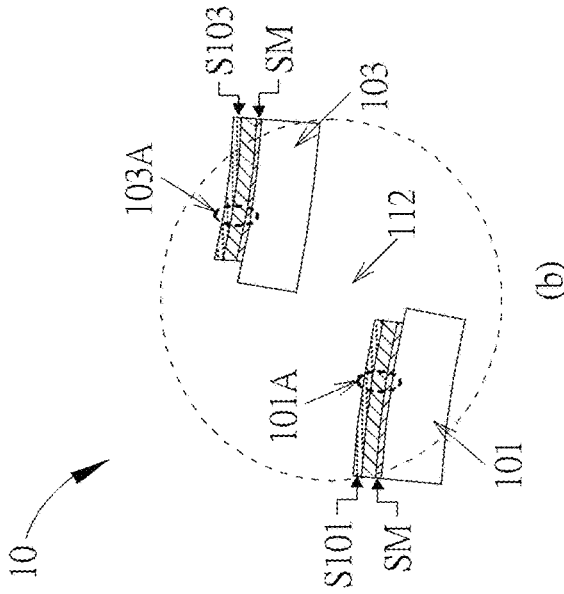
FIG. 1 illustrates an air-pulse generating (APG) device.
Figure 1:
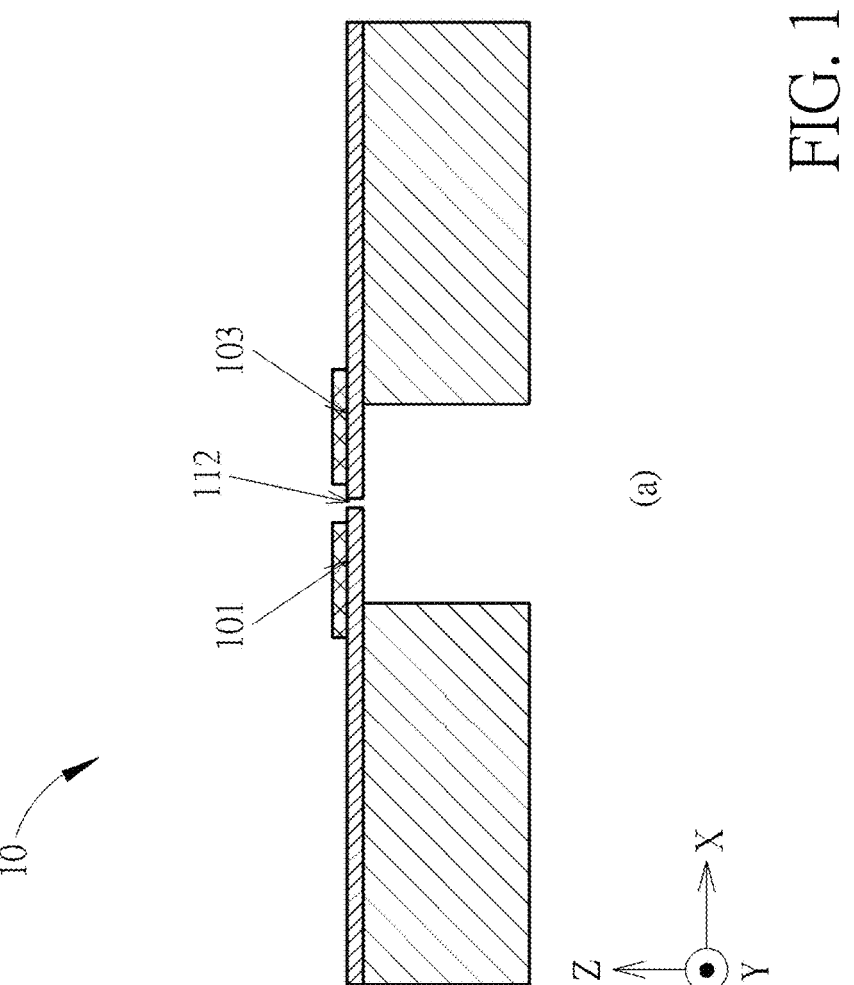

U.S. Pat. No. 11,943,585 filed by Applicant discloses an air-pulse generating (APG) device 10, which is shown in FIG. 1. The APG device 10 comprises a flap pair comprising flap 101 and 103. The APG device 10 also comprises an actuator 101A disposed on the flap 101 and an actuator 103A disposed on the flap 103. The actuator 101A/103A is driven by a demodulation driving signal S101/S103 and a modulation driving signal SM, to produce a plurality of air pulses at an ultrasonic pulse rate. The actuator 101A/103A comprises a top electrode and a bottom electrode. The two electrodes receive the demodulation driving signal and the modulation driving signal. In the embodiment shown in FIG. 1, the top electrode receives the demodulation driving signal S101/S103 and the bottom electrode receives the modulation driving signal SM, but not limited thereto.

The modulation driving signal SM drives the flap pair to perform a common mode movement. The demodulation driving signals S101 and S103 drive the flap pair to perform a differential mode movement. Suppose $U_{z,101}$ and $U_{z,103}$ represent displacement (in Z/vertical direction) of the flaps 101 and 103, respectively. Then the common mode movement may refer to a movement component of the flap pair which is $(U_{z,101}+U_{z,103})/2$, and the differential mode movement may refer to a movement component of the flap pair which is $|U_{z,101}-U_{z,103}|/2$.

A slit 112 is formed between the flaps 101 and 103. When the flap pair performs the differential mode movement (sometimes abbreviated as differential movement) such that $\Delta U_z=|U_{z,101}-U_{z,103}|$ is greater than a thickness of the flap, an opening (also denoted as 112) is formed. In one perspective, the differential movement of flaps 101 and 103 forms a virtual valve, also denoted as 112. When $\Delta U_z$ is small (smaller than the thickness of the flap) and/or an acoustic impedance/resistance is large so that airflow through the virtual valve 112 is negligible, the virtual valve 112 can be viewed as the slit 112, as shown in FIG. 1(a). When $\Delta U_z$ is large (larger than the thickness of the flap) and/or an acoustic impedance/resistance is small so that airflow through the virtual valve 112 is significant, the virtual valve 112 can be viewed as the opening 112, as shown in FIG. 1(b).

Figure 2:
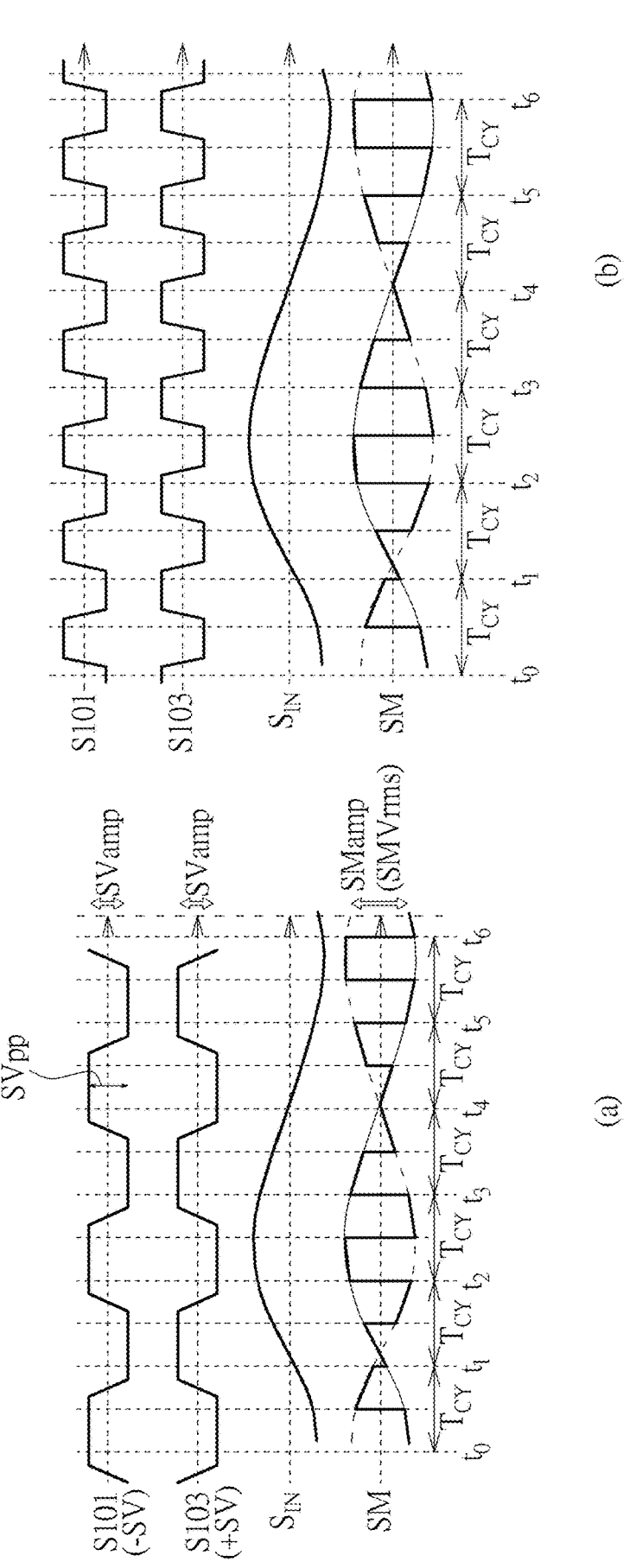
FIG. 2 illustrates waveforms of a demodulation driving signal and a modulation driving signal for the APG device of FIG. 1.

Waveforms of the demodulation driving signals S101, S103 and the modulation driving signal SM are shown in FIG. 2. The waveform of the modulation driving signal SM can be viewed as a (generalized) double sideband with suppressed carrier (DSB-SC), where a definition of "generalized DSB-SC" may be referred to U.S. Pat. No. 11,943,585 filed by Applicant, which is not narrated herein for brevity. The waveform of the demodulation driving signal S101/S103 can be viewed as a square/rectangular wave (similar to clock signal(s)), but not limited thereto. Note that, the phase relationship between the modulation driving signal and the demodulation driving signal is adaptable and not limited to the embodiment illustrated in FIG. 2.

The demodulation driving signals S101 and S103 may or may not be biased at the same level. When the demodulation driving signals S101 and S103 are biased at the same level, the flap pair may perform a symmetric differential movement without initial deflection. In this case, the demodulation driving signals S101 and S103 may be also denoted as +SV and −SV, as shown in FIG. 2(a). In the present application, notation "SV" is used to generally refer to the demodulation driving signal, which may represent either S101 or S103. On the other hand, when the demodulation driving signals S101 and S103 are biased at different levels, the flap pair would perform an asymmetric differential movement with asymmetric initial deflection. Herein, mechanical initial deflection of flap is corresponding to electrical voltage bias of/within the demodulation driving signals.

In an embodiment, as shown in FIG. 2(a), suppose the flap pair performs the symmetric differential movement without initial deflection, a demodulation frequency of the demodulation driving signals S101/S103 can be a half of a modulation frequency of the modulation driving signal SM. In another embodiment, as shown in FIG. 2(b), suppose the flap pair performs the asymmetric differential movement with asymmetric initial deflection (e.g., the flap 101 initially deflect toward a first direction (e.g., upward) and the flap 103 initially deflect toward a second direction opposite to the first direction (e.g., downward), which means the signal S101 may be biased at a voltage larger than the one of the signal S103), the demodulation frequency of the demodulation driving signals S101/S103 may be the same as the modulation frequency of the modulation driving signal SM.

In the present application, the demodulation frequency of the demodulation driving signals is also referred to (as) operating frequency of the APG device, denoted as Fv. The ultrasonic pulse rate would be the modulation frequency of the modulation driving signal and corresponding to the operating frequency Fv.

In the embodiment shown in FIG. 2(a), the virtual valve 112 is closed during the period corresponding to the demodulation driving signals S101, S103 being in transition. In the embodiment shown in FIG. 2(b), the virtual valve 112 is closed when one of the demodulation driving signals is high and the other is low. For example, in FIG. 2(b), the virtual valve 112 is closed when the signal S103 is high and the signal S101 is low, assuming the flap 101 initially deflects upward and the flap 103 initially deflects downward.

As taught by U.S. Pat. No. 11,943,585, in the modulation perspective, the modulation driving signal SM resulting in the common mode movement leads to generating amplitude-modulated (AM) wave (pressure variation). In the demodulation perspective, the virtual valve 112 controlled by the demodulation driving signal SV functions as an acoustic diode for AM demodulation, which is elaborated in FIG. 3 and FIG. 4.

Figure 3:
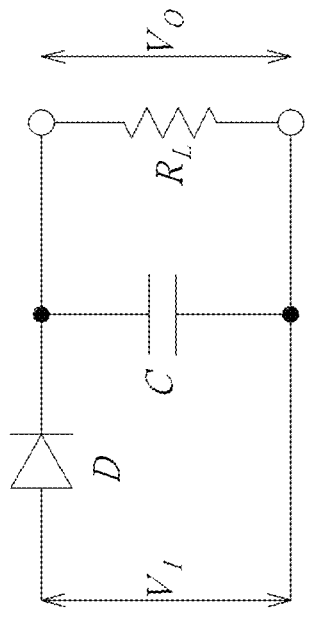
FIG. 3 illustrates a characteristic curve of conductance of virtual valve versus displacement difference and an AM demodulator for AM demodulation.
Figure 3:
Figure 3:
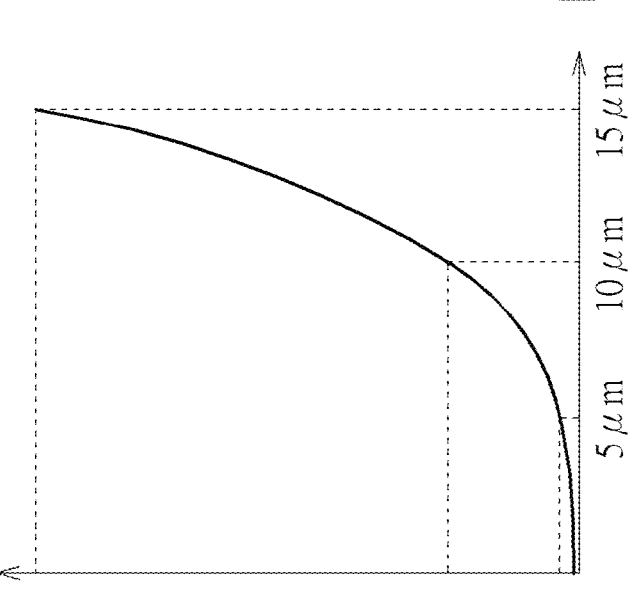

FIG. 3 illustrates a (characteristic) curve of the conductance $G_{valve}$ of virtual valve 112 versus the displacement difference $\Delta U_z$ (in FIG. 3(a)) and an AM demodulator or an envelope detector for AM demodulation (in FIG. 3(b)). In FIG. 3(a), the characteristic curve is convex or concave up, and the valve conductance $G_{valve}$ increases faster as the displacement difference $\Delta U_z$ increases especially when $\Delta U_z$ is larger. The characteristic curve of the virtual valve 112 is similar to a characteristic of diode. The virtual valve 112 may be employed as an acoustic diode, e.g., in the context of AM demodulation. AM demodulation is known in the art. An analogy between the demodulation operation which the APG device performs and conventional known AM demodulator is described below. In FIG. 3(b), "$V_I$" may be analogous to the AM wave or AM pressure variation, "diode D" may be analogous to the virtual valve 112, "capacitor C" and "resistance $R_L$" represent acoustic capacitance and acoustic resistance of ambient and together form a low pass filer (LPF), and "Vo" may be analogous/corresponding to sound perceived by human ear.

In other words, given the common mode movement generates AM wave or AM pressure variation as "$V_I$", the virtual valve 112 functions as diode "D" (as a rectifier) to produce unipolar air pulse, and acoustic capacitance "C" and resistance "$R_L$" embedded in ambient function as LPF to filter out ultrasonic component and leave audible portion (potion within audible spectrum band) "Vo" to human hearing system.

Figure 4:
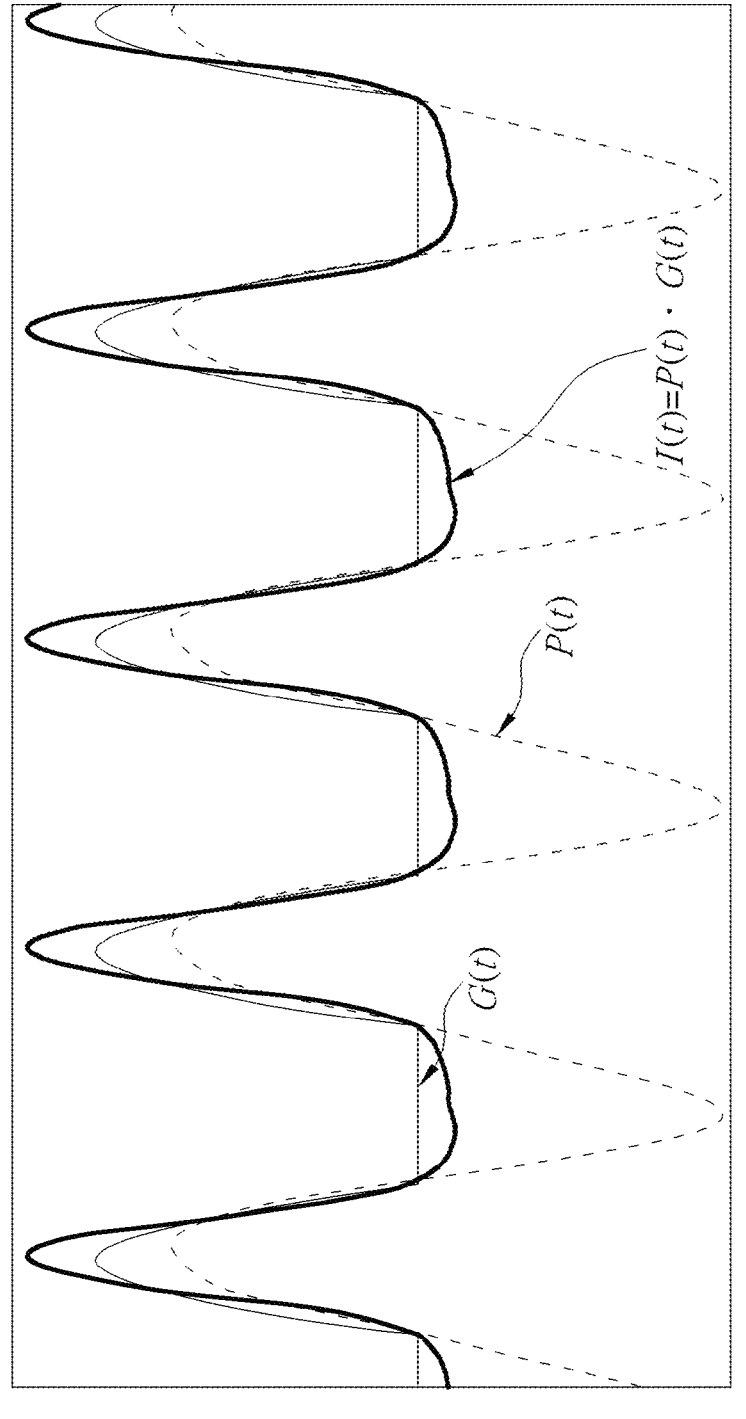
FIG. 4 illustrates an airflow I(t), an air pressure wave P(t) and a virtual valve conductance G(t).

To see how the rectifier works, FIG. 4 illustrates an airflow I(t), produced by the APG device, which can be expressed as (or related to) an air pressure wave P(t) times a virtual valve conductance G(t), mathematically I(t)=P(t) ·G(t) (eq. 1), demonstrating an effect of rectifier (brought by diode or virtual valve 112) in the AM demodulator or the envelope detector.

Note that, amplitude of output airflow I(t) would determine volume of sound which the APG device as sound producing device can produce. On the other hand, according to the concept behind FIG. 4 and eq. 1, amplitude of output airflow I(t) would be determined according to both amplitude of AM pressure wave P(t) (suppose P(t) is amplitude modulated) and amplitude of conductance G(t). The amplitude of AM pressure wave P(t) is affected by an amplitude of the modulation driving signal, denoted as SMamp. The amplitude of conductance G(t) is affected by the displacement difference $\Delta U_z$, and the displacement difference $\Delta U_z$ is affected at least by an amplitude of the demodulation driving signal, denoted as SVamp.

It can be concluded that, volume of the APG device as sound producing device can be adjusted via both SVamp and SMamp, amplitude of the demodulation driving signal SV and amplitude of the modulation driving signal SM, where SVamp may be regarded as an adjustable parameter for sensitivity adjustment.

Figure 5:
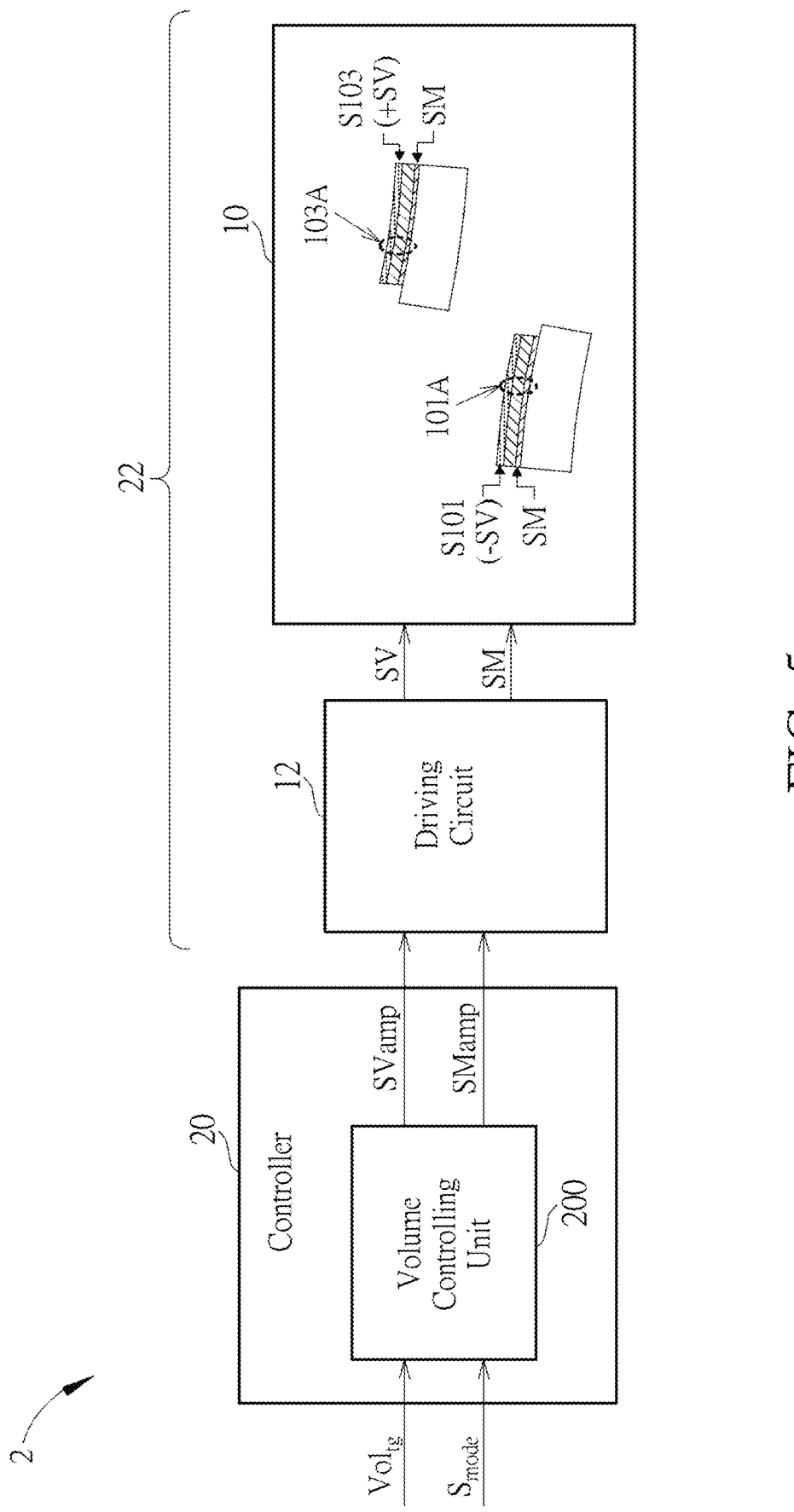
FIG. 5 illustrates a schematic diagram of a sound producing system according to an embodiment of the present application.

FIG. 5 illustrates a schematic diagram of a sound producing system 2 according to an embodiment of the present application. The sound producing system 2 comprises a controller 20 and a sound producing module 22. The sound producing module 22 comprises a driving circuit 12 and the APG device 10. The driving circuit 12 is configured to generate the demodulation driving signal SV and the modulation driving signal SM to drive the APG device 10, such that the APG device 10 produces sound via generating a plurality of air pulses at an ultrasonic pulse rate. In an embodiment, the driving circuit 12 may comprise circuit disclosed in U.S. Pat. Nos. 12,261,567 and/or 12,107,546 filed by Applicant to produce the signals SV and SM, which is not limited thereto.

The sound producing module 22 may be disposed within a wearable sound device, a wearable device which can produce sound. For example, the wearable sound device may be earbud, earphone, hearing aid, smart watch, smart glasses, AR/VR/MR/XR device (where AR/VR/MR/XR represents augmented/virtual/mixed/extended reality).

The controller 20 comprises a volume controlling unit 200. The volume controlling unit 200 is configured to determine the demodulation amplitude SVamp and the modulation amplitude SMamp corresponding to a target volume $Vol_{tg}$, so that the driving circuit 12 generates demodulation driving signal SV with the demodulation amplitude SVamp and the modulation driving signal SM with the modulation amplitude SMamp to drive the APG device 10 to achieve the target volume $Vol_{tg}$.

In an embodiment, the controller 20 may be realized by a System-on-Chip (SoC), e.g., QCC series provided by Qualcomm company. The volume controlling unit 200 may be software or firmware (or even programming code segment(s)) executed by hardware device such as the controller 20. In an embodiment, functions of the volume controlling unit 200 may be built as/within an application programing interface (API) within the SoC or within the controller 20. The volume controlling unit 200 may receive the target volume $Vol_{tg}$ from upper level/layer of program, e.g., from application level of volume adjustment, via API within SoC, which is not limited thereto.

In an embodiment, the volume controlling unit 200 may have a set of parameter curves (in mind) and outputs amplitude parameters SVamp and SMamp corresponding to the target volume $Vol_{tg}$ according to the set of parameter curves.

Figure 6:
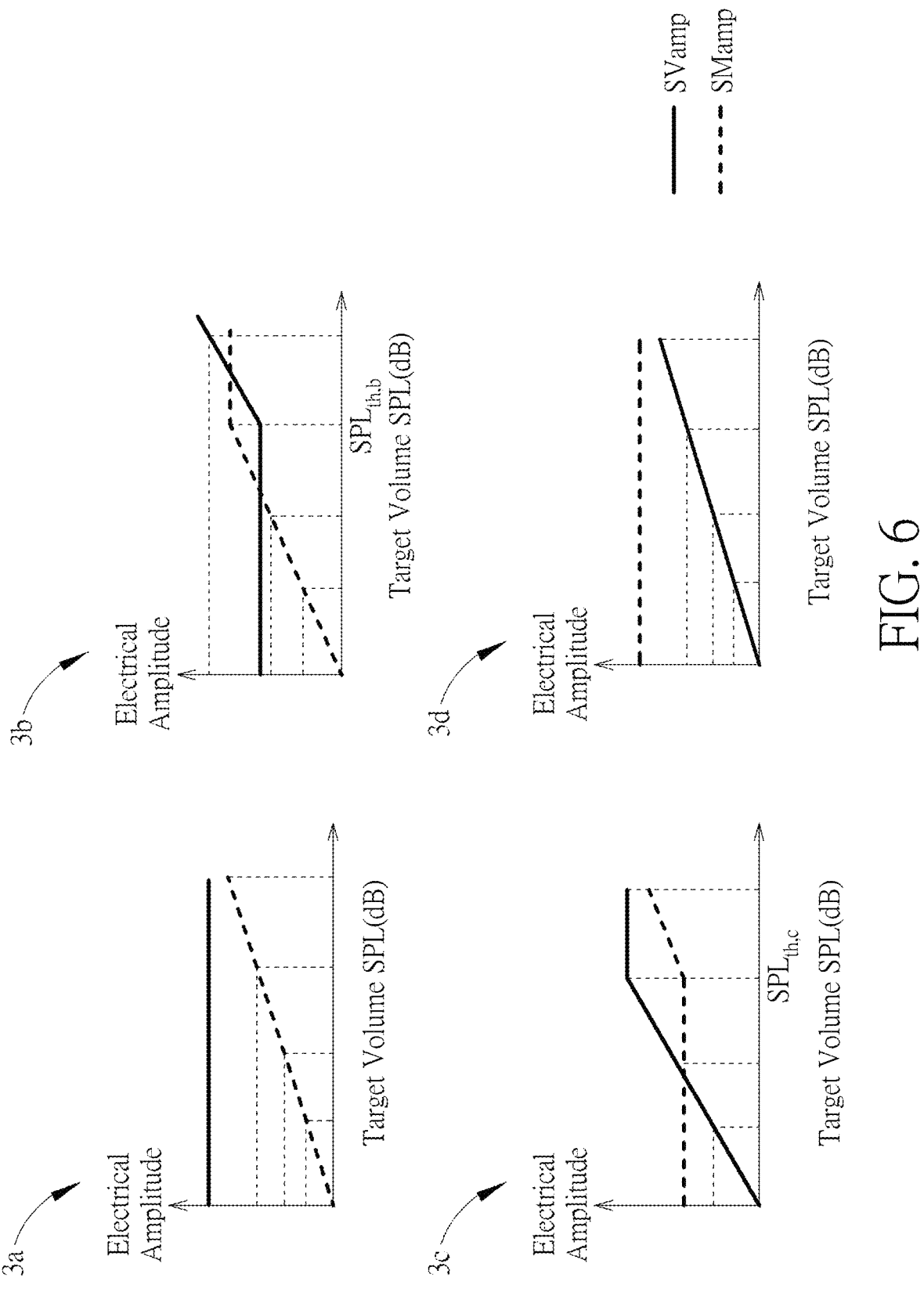
FIG. 6 illustrates four sets of parameter curves according to embodiments of the present application.

For example, FIG. 6 illustrates four sets of parameter curves 3a, 3b, 3c, 3d according to embodiments of the present application. For a specific target volume $Vol_{tg}$, the volume controlling unit 200 may find corresponding amplitude parameters SVamp and SMamp according to the set of parameter curves, which may be 3a, 3b, 3c or 3d, but not limited thereto.

In an embodiment, the demodulation amplitude parameter SVamp may be a peak-to-peak voltage of the demodulation driving signal SV, denoted as SVpp. In an embodiment, the modulation amplitude parameter SMamp may be a root-mean-square voltage of the modulation driving signal SM, denoted as SMVrms. The driving circuit 12 may generate the demodulation driving signal SV and the modulation driving signal SM according to SVpp and SMVrms, which is not limited thereto.

In the present application, the term "(de)modulation amplitude parameter" may sometimes be abbreviated as "(de)modulation amplitude" for brevity.

In the parameter curve set 3a, the demodulation amplitude parameter SVamp may be kept as constant while the modulation amplitude parameter SMamp increases/decreases as target volume (in terms of sound pressure level (SPL)) increases/decreases. In an embodiment, the volume controlling unit 200 employing the parameter curve set 3a might bring advantage of high sound quality or fidelity (or equivalently low total harmonic distortion (THD)).

In the parameter curve set 3b, below a threshold $SPL_{th,b}$ the demodulation amplitude parameter SVamp is kept as constant and the modulation amplitude parameter SMamp increases/decreases as target volume increases/decreases; while above the threshold $SPL_{th,b}$ the demodulation amplitude parameter SVamp increases/decreases as target volume increases/decreases and the modulation amplitude parameter SMamp is kept as constant.

In the parameter curve set 3c, below a threshold $SPL_{th,c}$ the demodulation amplitude parameter SVamp increases/decreases as target volume increases/decreases and the modulation amplitude parameter SMamp is kept as constant; while above the threshold $SPL_{th,c}$ the demodulation amplitude parameter SVamp is kept as constant and the modulation amplitude parameter SMamp increases/decreases as target volume increases/decreases. In an embodiment, the volume controlling unit 200 employing the parameter curve set 3c might bring advantage of low power.

In the parameter curve set 3d, the demodulation amplitude parameter SVamp increases/decreases as target volume increases/decreases while the modulation amplitude parameter SMamp may be kept as constant, e.g., a high level. The volume controlling unit 200 employing the parameter curve set 3d might have advantage of achieving bit perfect or enhancing SQNR (signal-to-quantization-noise ratio).

It can be seen from FIG. 6, the demodulation amplitude SVamp and the modulation amplitude SMamp vary in different manners versus the target volume.

Note that, each parameter curve (e.g., SVamp/SMamp vs. SPL) shown in FIG. 6 represents a mapping relationship, which can be obtained by experiments or simulations. The volume controlling unit 200 may implement the parameter curves or the mapping relationship either by 1) storing the mapping relationship in a memory (like a look-up table) and referring to the memory or the look-up table to obtain the SVamp and SMamp corresponding to the target volume $Vol_{tg}$; or 2) formulating the mapping relationship as formulas and calculating SVamp and SMamp corresponding to the target volume $Vol_{tg}$.

In the present application, the volume controlling unit 200 having the parameter curve means either the mapping relationship of the parameter curve has been stored in a memory within the controller 20 or the volume controlling unit 200 has the formula of the parameter curve to calculate accordingly.

Note that, the sets of parameter curves illustrated in FIG. 6 are for illustrative purpose. The sets of parameter curves or the parameter curves are not limited to the shapes shown in FIG. 6. As long as two amplitude parameters, SVamp and SMamp, are used to achieve the target volume $Vol_{tg}$, requirement of the present invention is satisfied.

In fact, there are various aspects of performance of the sound producing system with the APG device, and it is not easy to optimize all of them at once. For example, the parameter curve set 3a may bring good sound quality but consume more power (since SVamp/SVpp is high); the parameter curve set 3c may consume less power (since SVamp/SVpp can be very low) but may sacrifice sound quality.

To make the sound producing system more flexibly achieving all aspects of performance (probably not at the same time), it is possible to let the user to decide which aspect to optimize. For example, some user might use the sound producing system to enjoy his/her classical music and does not care much about the power consumption, (s)he may choose a "high fidelity" mode via an user interface, e.g., a mobile application. Alternatively, power consumption might be a concern of another user and sound fidelity/quality might not. In this case, (s)he may choose a "low power" mode.

In this case, the volume controlling unit 200 may receive a mode signal $S_{mode}$ indicating which operation mode the sound producing module 22 operates in or switches to. The volume controlling unit 200 may choose a set of parameter curves among a plurality of sets of parameter curves according to the mode signal $S_{mode}$, where the plurality of sets of parameter curves is corresponding to a plurality of operation modes. For example, the volume controlling unit 200 may choose the set 3a when the mode signal $S_{mode}$ indicates the sound producing module operates in or is going to switch to a high fidelity mode. Alternatively, the volume controlling unit 200 may choose the set 3c when the mode signal $S_{mode}$ indicates the sound producing module operates in or is going to switch to a low power mode.

In other words, the sound producing module 22 may operate in one mode among a plurality of operation modes, the volume controlling unit 200 may have a plurality of sets of parameter curves corresponding to the plurality of operation modes, and the mode signal $S_{mode}$ would indicate the volume controlling unit 200 which set of parameter curves to be used to obtain SVamp and SMamp.

The plurality of operation modes may comprise a high fidelity mode, a low power mode, a high longevity mode, a low noise mode, etc. Each operation mode has its objective optimized or to be optimized. Even though term of "high/low" carries relative concept, "high/low xxx mode" herein indicates that objective xxx is optimized among all operation modes. For example, in the high fidelity mode, sound quality is optimized compared to other operation modes. For example, in high longevity mode, amplitudes SVamp and SMamp are optimized such that electrical field stress applied on the actuator (e.g., 101A/103A) is minimized. Parameter curves for the high longevity mode may be designed and refined according to practical situation.

In addition to amplitude parameter(s) SVamp/SMamp, operating frequency Fv might also be a control factor for controlling/adjusting volume. When the operating frequency Fv approaches (or is closer to) a resonance frequency Fr of the air-pulse generating device, the flap 101/103 would have larger displacement and the flap pair has larger $\Delta U_z$ under the same amplitudes SVamp and SMamp applied on the actuators.

Figure 7:
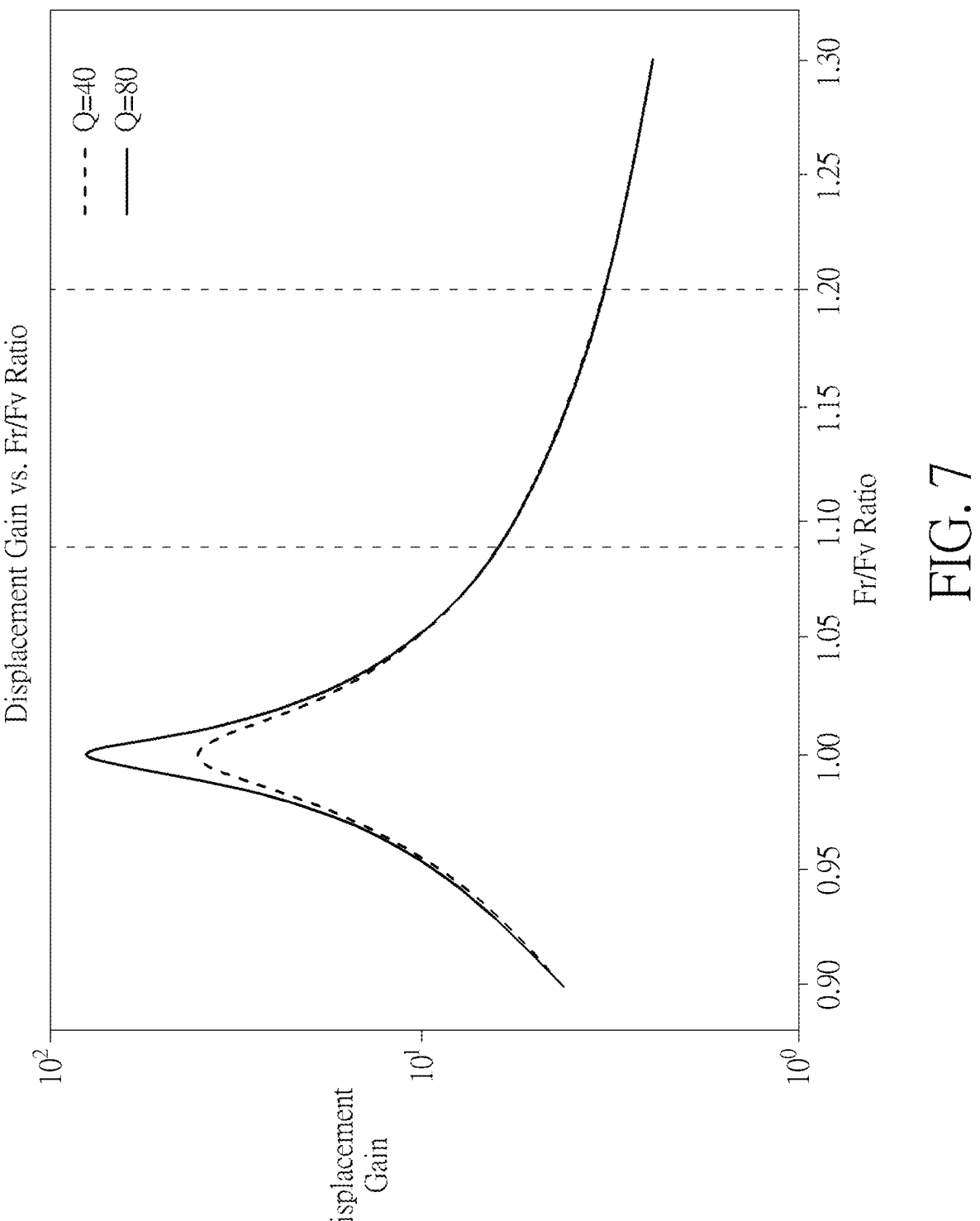
FIG. 7 illustrates curves of displacement gain versus a ratio of Fr/Fv for the APG device of FIG. 1.

It can be validated by FIG. 7, illustrating curves of displacement gain (compared to DC (direct current) frequency being applied to the flap pair) versus a ratio of Fr/Fv (for flap pair with different quality factor Q), where Fr/Fv→1 means the operating frequency Fv approaches a resonance frequency Fr, for the APG device 10.

When the operating frequency Fv approaches (or is closer to) the resonance frequency Fr, conductance of virtual valve 112 (e.g., amplitude of conductance G(t)) increases. It can be implied that, the displacement difference $\Delta U_z$ (and volume of the APG device as sound producing device) is also affected by the operating frequency Fv.

It can be concluded that, volume of the APG device as sound producing device can be adjusted via the operating frequency Fv, where Fv may be regarded as an adjustable parameter for sensitivity adjustment.

The volume controlling unit 200 may adjust the operating frequency Fv (directly or indirectly) to be closer to the resonance frequency Fr of the APG device. In other words, the volume controlling unit 200 may adjust a parameter such that a first difference between the first operating frequency (before the operating frequency adjustment) and a resonance frequency Fr of the APG device is greater than a second difference between the second operating frequency (after the operating frequency adjustment) and the resonance frequency Fr of the APG device. The parameter herein may be, e.g., the operating frequency Fv of the APG device directly or the Fr/Fv ratio indirectly. In an embodiment, adjusting the operating frequency Fv to be closer to the resonance frequency Fr may be corresponding to a circumstance of adjusting the volume to be louder, a low power mode or a high longevity mode.

On the other hand, the volume controlling unit 200 may adjust the operating frequency Fv (directly or indirectly) to be away from the resonance frequency Fr of the APG device. In other words, the volume controlling unit 200 may adjust a parameter such that a first difference between the first operating frequency (before the operating frequency adjustment) and a resonance frequency Fr of the APG device is less than a second difference between the second operating frequency (after the operating frequency adjustment) and the resonance frequency Fr of the APG device. The parameter herein may be, e.g., the operating frequency Fv of the APG device directly or the Fr/Fv ratio indirectly. In an embodiment, adjusting the operating frequency Fv to be away from the resonance frequency Fr may be corresponding to a circumstance of a low noise mode, since it is observed that noise within the sound producing module 22 may be lower when the operating frequency Fv is away from the resonance frequency Fr.

As can be seen, volume control of the present invention can be done by adjusting SVamp and Fv, in addition to SMamp which may be associated with DAC (Digital-to- Analog Converter) operation. In the present application, volume control via sensitivity adjustment (such as via the parameters SVamp and Fv) or via mode selection to achieve superior SQNR and/or power efficiency may be referred to (as) smart volume control. Due to additional (sensitivity adjustment) parameters SVamp and Fv, allowing more degree of freedom for volume control, bit-perfect with superior SQNR can be achieved.

This is because the unique characteristics of the APG-based system directly address the limitations of conventional audio volume control. By precisely modulating air pulses through adjustable demodulation and modulation amplitudes (SVamp and SMamp), the present invention avoids the inherent SQNR degradation associated with digital bit truncation. Furthermore, the ability to control volume via the APG device's intrinsic "sensitivity" (via SVamp or Fv) fundamentally resolves the power inefficiency and the dilemma between power and audio quality faced by traditional transducers. The multi-modal or mode-selective operation, allowing optimization for high fidelity, low power, or low noise, provides a flexible solution that was unattainable with prior art methods.

In summary, the present invention, utilizing SVamp, Fv and SMamp as volume adjustment parameter(s), offers a robust and superior mechanism for volume control that enhances both audio fidelity and energy efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller, configured to control a sound producing module, the controller comprising:
   a volume controlling unit, configured to determine a demodulation amplitude and a modulation amplitude corresponding to a target volume;
   wherein the sound producing module comprises a driving circuit and an air-pulse generating device;
   wherein the driving circuit generates a demodulation driving signal according to the demodulation amplitude and generates a modulation driving signal according to the modulation amplitude, so as to drive the air-pulse generating device;
   wherein the air-pulse generating device produces sound via generating a plurality of air pulses at an ultrasonic pulse rate.

2. The controller of claim 1, wherein the controller is realized by a System-on-Chip (SoC).

3. The controller of claim 1, wherein the volume controlling unit is associated with an application programing interface (API).

4. The controller of claim 1, wherein the volume controlling unit adjusts an operating frequency of the air-pulse generating device corresponding to the ultrasonic pulse rate.

5. The controller of claim 1,
   wherein the volume controlling unit determines the demodulation amplitude and the modulation amplitude according to a set of parameter curves.

6. The controller of claim 5,
   wherein the volume controlling unit determines the demodulation amplitude and the modulation amplitude according to the set of parameter curves among a plurality of sets of parameter curves.

7. The controller of claim 1,
   wherein the volume controlling unit receives a mode signal indicating that the sound producing module operates in a first mode among a plurality of modes;
   wherein the volume controlling unit determines the demodulation amplitude and the modulation amplitude according to the target volume and the mode signal.

8. The controller of claim 7,
   wherein the plurality of modes comprises at least one of a low power mode, a high fidelity mode, a high longevity mode and a low noise mode.

9. The controller of claim 7,
   wherein the volume controlling unit determines the demodulation amplitude and the modulation amplitude according to a first set of parameter curves corresponding to the first mode among the plurality of modes.

10. The controller of claim 7,
    wherein the plurality of modes corresponds to a plurality of sets of parameter curves.

11. The controller of claim 1,
    wherein the volume controlling unit keeps the demodulation amplitude as constant and increases the modulation amplitude as the target volume increases.

12. The controller of claim 1,
    wherein the volume controlling unit increases the demodulation amplitude as the target volume increases and keeps the modulation amplitude as a first constant when the target volume is less than a threshold, and the volume controlling unit keeps the demodulation amplitude as a second constant and increases the modulation amplitude as the target volume increases when the target volume is greater than the threshold.

13. The controller of claim 1,
    wherein the volume controlling unit keeps the demodulation amplitude as a first constant and increases the modulation amplitude as the target volume increases when the target volume is less than a threshold, and the volume controlling unit increases the demodulation amplitude as the target volume increases and keeps the modulation amplitude as a second constant when the target volume is greater than the threshold.

14. The controller of claim 1,
    wherein the volume controlling unit increases the demodulation amplitude as the target volume increases and keeps the modulation amplitude as constant.

15. The controller of claim 1,
    wherein the demodulation amplitude and the modulation amplitude vary in different manners versus the target volume.

16. The controller of claim 1,
    wherein the sound producing module is disposed within a wearable sound device.

17. A controller, configured to control a sound producing module, the controller comprising:
    a volume controlling unit;
    wherein the sound producing module comprises an air-pulse generating device;
    wherein the air-pulse generating device produces sound via generating a plurality of air pulses at an ultrasonic pulse rate;
    wherein the volume controlling unit adjusts a parameter such that an operating frequency of the air-pulse generating device is adjusted;
    wherein a volume of the sound produced by the air-pulse generating device is adjusted via adjusting the operating frequency.

18. The controller of claim 17, wherein the volume controlling unit adjusts the parameter such that the operating frequency is closer to a resonance frequency of the air-pulse generating device.

19. The controller of claim 17, wherein the volume controlling unit adjusts the parameter such that the operating frequency is away from a resonance frequency of the air-pulse generating device.

20. A volume determining method, applied in a volume controlling unit within a controller for controlling a sound producing module, the volume determining method comprising:

determining a demodulation amplitude and a modulation amplitude corresponding to a target volume;

wherein the sound producing module comprises a driving circuit and an air-pulse generating device;

wherein the driving circuit generates a demodulation driving signal according to the demodulation amplitude and generates a modulation driving signal according to the modulation amplitude, so as to drive the air-pulse generating device;

wherein the air-pulse generating device produces sound via generating a plurality of air pulses at an ultrasonic pulse rate.

21. The volume determining method of claim 20, comprising:

receiving a mode signal indicating that the sound producing module operates in a first mode among a plurality of modes; and determining the demodulation amplitude and the modulation amplitude according to the target volume and the mode signal.

22. A volume adjusting method, configured to adjust a volume of a sound producing module, the volume adjusting method comprising:

adjusting an operating frequency of an air-pulse generating device corresponding to an ultrasonic pulse rate;

wherein the sound producing module comprises the air-pulse generating device;

wherein the air-pulse generating device produces sound via generating a plurality of air pulses at the ultrasonic pulse rate.

\* \* \* \* \*